May 2, 1933.   W. T. EDWARDS   1,906,925
VIBRATION DAMPER
Filed May 31, 1930
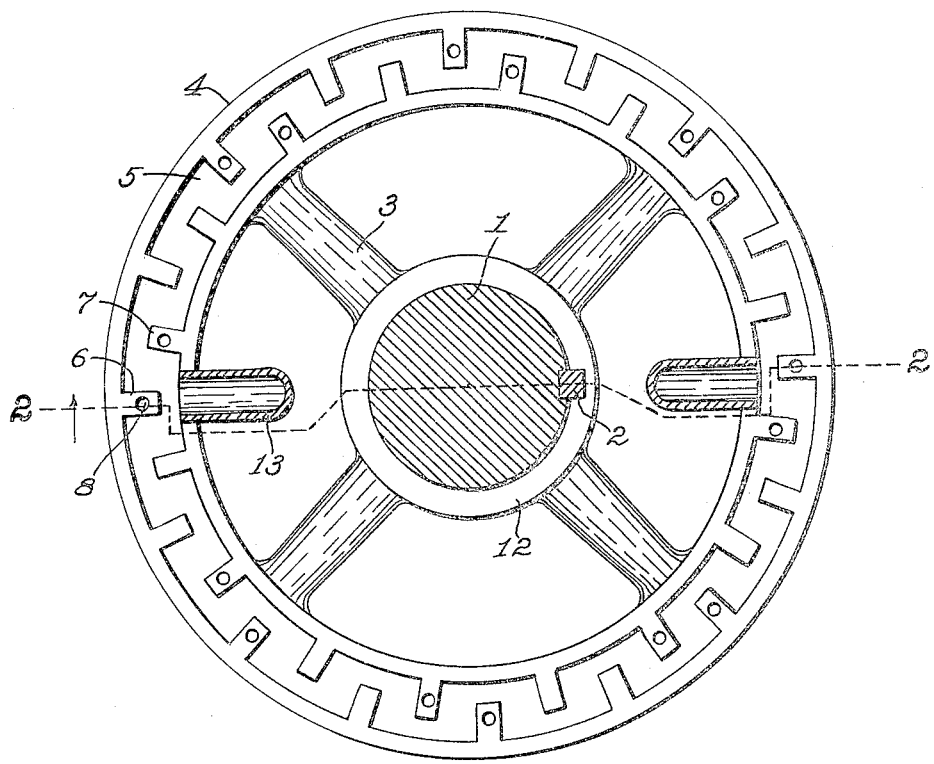
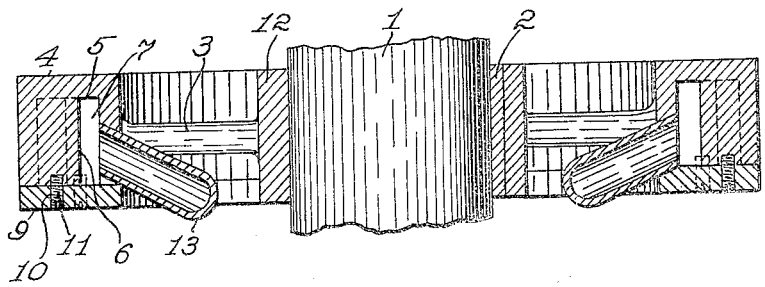
INVENTOR
William T. Edwards,
BY
ATTORNEY Patented May 2, 1933

1,906,925

UNITED STATES PATENT OFFICE

WILLIAM T. EDWARDS, OF WATERLOO, IOWA

VIBRATION DAMPER

Application filed May 31, 1930. Serial No. 457,887.

My invention relates to improvements in vibration dampers, and the object of my improvement is to supply particularly for motor cars and the like, or to be used wherever useful and applicable, on a shaft or crank-shaft of the car motor, or other rotary element of other apparatus, a device adapted to absorb vibrations due to crank jerking or otherwise, and by the use of an included flowable element acting both by friction on other elements and by its own inertia, to effect the above purpose.

This object I have accomplished by the means which are hereinafter described and claimed, and which are illustrated in the accompanying drawing, in which Fig. 1 is a face elevation of the annular chamber of the device and its mounting, with parts in section, and with the cover plate of the chamber absent, as before permanently welding it upon the chamber to hermetically close the latter. Fig. 2 is a diametral cross section of said chamber, showing its carrying shaft broken away at each end, and in elevation, and with said cover plate permanently secured upon and to close the chamber, and taken on the broken line 2—2 of said Fig. 1.

The drawing shows one type of my device, but it is to be understood that various modifications may be effected in the construction thereof without departing from the protection of the appended claims, or from the scope of my invention.

Motor car engines have a periodical vibration, caused it is said, by a synchronization of the power impulses in the motor with the natural period of vibration of the crank-shaft. This vibration is manifested by the threshing of the crank-shaft at certain speeds. This vibration is a very disagreeable feature in cars, and various purely mechanical devices have been used to damp the vibrations, but unsatisfactory for different reasons.

In my device use is made of a closed annular chamber mounted fixedly on the crankshaft, and filled with a flowable element, preferably one of considerable weight, such as mercury, whereby while the crank-shaft is rotating the mercury by reason of its inherent inertia, lags behind as the chamber rotates, causing friction thereagainst and impedance due to baffling means within the hollow of the chamber.

The numeral 1 denotes a portion of a rotary shaft, such as a motor crank-shaft. Upon this a hub 12 is keyed at 2, the hub having radiating spokes 3 with integral connections to a hollow closed annular chamber 4 coaxial with the shaft. The annular hollow 5 of said chamber is interrupted partially at circumferentially spaced places by staggered projections 6 and 7, respectively upon the walls of said hollow farthest and nearest the shaft, and whose ends are spaced from the opposite wall.

Certain of these projections 6 and 7 have interiorly threaded sockets 8 to receive headless screws 11 which also are threaded into and traverse registering interiorly threaded holes in an annular covering plate 9, as shown in Fig. 2, securing the plate to the projections 6 and 7 all around the chamber 4. One of the screw holes 10 is utilized, after the plate 9 is fitted upon the face of the chamber 4, and before the welding of the plate to the chamber, and when the plate is turned slightly to displace the particular hole from the projection to which it is to be secured, it being understood that the chamber is supported in a horizontal plane with the plate on top, to permit the pouring therethrough of mercury, or other suitable flowable substance, into the chamber cavity 5 in an amount sufficient to fill this cavity only. The numeral 13 denotes a pair of diametrically opposite pockets or cups of elongated shape and radial disposition, which have their outer open ends welded into holes in the inner wall of the annular chamber 4. When the shaft is in rotation, centrifugal force moves the mercury outwardly, leaving these pockets vacant, as only enough mercury is deposited in the chamber 5 to fill it but not the pockets at a desired minimum temperature. This may be 60 degrees Fahrenheit, or the equivalent thereof in some other thermometric scale.

When the cavity 5 is thus filled by a quantity at said temperature which excludes the mercury from the pockets 13 when the device is in rotation at speed, and after the screws 11 are all placed and welded hermetically to the projections 6 and 7, the device is complete and ready for use.

The baffling projections 6 and 7 which are staggered relatively, and extend partially across the hollow 5, serve, while the chamber 4 is in rotation, to impede the mercury to a certain extent, from lagging unduly in the hollow due to the inertia of the heavy mercury, baffling it with sufficient consequent friction against the projections, to cause the mercury to absorb nearly all of the vibrations in the shaft 1 and chamber 4.

Yet the mercury may flow, or rather a slippage occurs between the circumferential inner walls of the chamber 4 and the mercury as the latter lags behind, so that this flowage or slippage is regular and unvaried at a constant speed of the shaft. There is no loss or destruction of the mercury due to this friction, and the frictional contact of the mercury with the chamber walls and the projections 6 and 7 is at a minimum for wear of the latter, although whatever friction there is cooperates with the inertia of the mercury to cause the mercury to evenly absorb vibrations.

In higher temperatures, for instance if the range of temperatures of use is from sixty to one hundred and twenty degrees Fahrenheit, or other limits, the expanding mercury enters the pockets 13, the whole device being thus kept always perfectly balanced on the shaft 1, and functioning perfectly at any intermediate temperature. There is therefore present no mechanical assemblage of metallic elements as in other devices, to become gradually worn, displaced, and rendered more and more inefficient with time.

The device is very compact, noiseless, inexpensive, and easy to assemble, and requires no disassembling, except perhaps for a removal of the annular chamber 4 from the shaft 1.

Having described my invention, what I claim as new, and desire to secure by Letters Patent, is:

1. In a device of the character described, comprising a closed rotary annular chamber having a pocket in its inner wall directed substantially toward the axis of the chamber, and a mercury content filling said chamber but not said pocket except upon expansion of the mercury at a relatively high temperature.

2. In a device of the character described, comprising a rotary annularly hollowed and interiorly transversely ribbed body, and a closed hollow pocket in communication with it and directed radially toward the axis of the device, and a heavy flowable element of volume sufficient to fill the annular hollow only excepting the said closed hollow pocket, the latter serving to receive part of said element upon heat expansion thereof.

3. In a device of the character described, a circular rotatable element secured on a rotatable shaft and having a circumferential coaxial hollow rim containing oppositely directed evenly spaced like numerous projections forming oppositely opening pockets, said rim also having a means in communication with the hollow thereof and directed toward the shaft to receive parts of a mercury content in the hollow of the rim in expanding, and a mercury content for and in the hollow of the rim.

In testimony whereof I affix my signature.

WILLIAM T. EDWARDS.